UNITED STATES PATENT OFFICE.

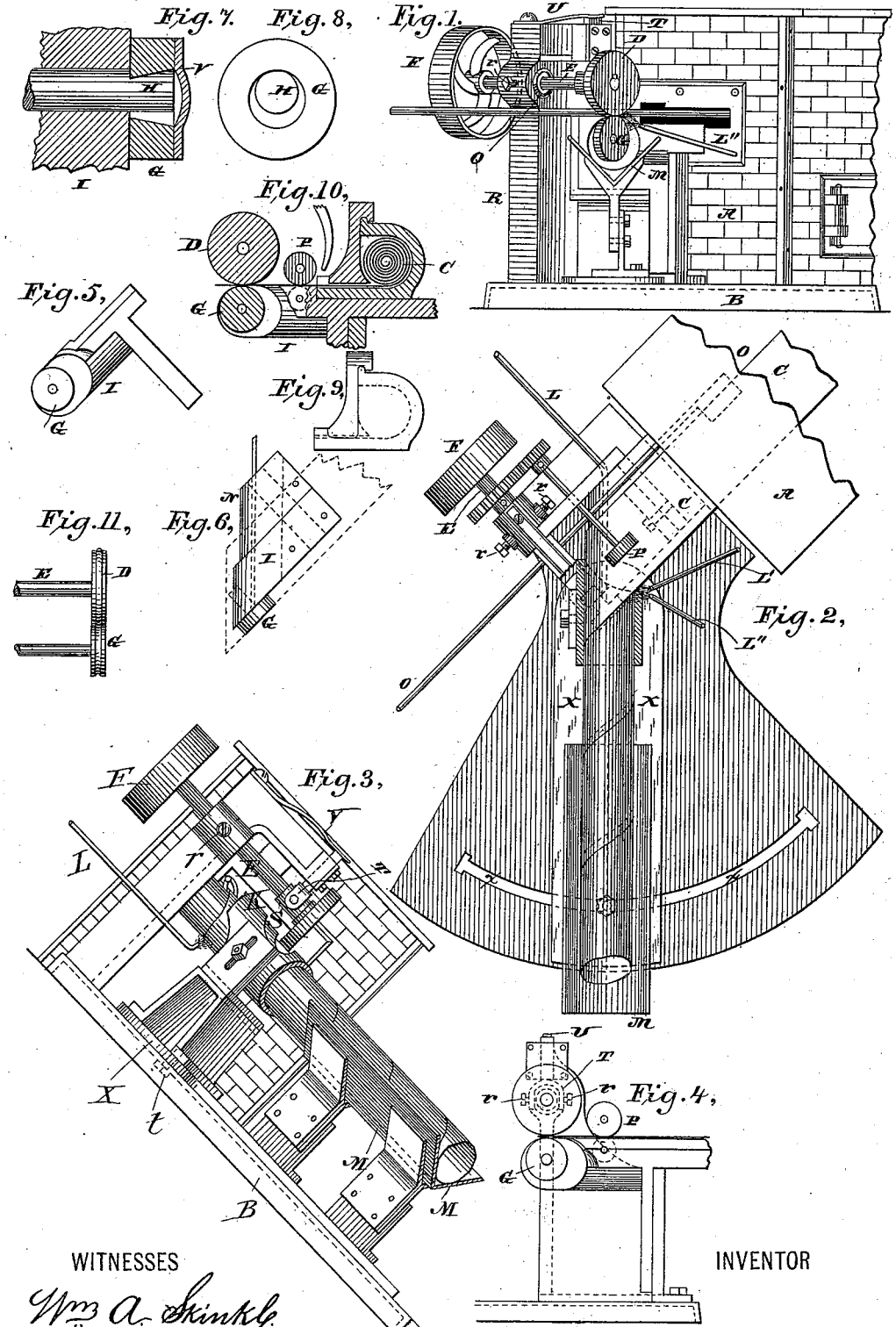

JOHN B. ROOT, OF PORT CHESTER, NEW YORK; HANNAH M. ROOT ADMINISTRATRIX, AND WILLIAM S. CHURCH ADMINISTRATOR, OF SAID JOHN B. ROOT, DECEASED.

METHOD OF MAKING SPIRALLY-WELDED TUBING.

SPECIFICATION forming part of Letters Patent No. 376,681, dated January 17, 1888.

Original application filed September 9, 1881, Serial No. 42,275. Divided and this application filed June 28, 1886. Serial No. 206,646. (No model.) Patented in England, August 3, 1886, No. 9,951, and in Canada, August 9, 1887, No. 27,382.

*To all whom it may concern:*

Be it known that I, JOHN B. ROOT, of Port Chester, in the county of Westchester and State of New York, have invented certain new and useful Improvements in the Manufacture of Metal Pipe, (for which Letters Patent have been granted in Great Britain, numbered 9,951, dated August 3, 1886, and in the Dominion of Canada, numbered 27,382, dated August 9, 1887,) of which the following is a full, clear, and exact description.

This invention relates generally to that class of metal pipe made by spirally winding a strip or ribbon of sheet metal into cylindrical form with its opposite edges overlapping, raising such edges only to a welding heat as they are brought together in the winding, and then forcing the heated edges into intimate contact, so as to produce a welded seam. The article thus produced is described in a pending application for United States Letters Patent filed by me September 9, 1881, Serial No. 42,275, of which the present application is a division.

Sheet-metal pipes have heretofore been made with interlocking edges, so as to form what is known in the art as an "interlocking seam," making a spiral rib standing out from the exterior surface of the pipe. Such pipe has also been made with the opposite edges of the blank overlapped and riveted together, as fully illustrated in my United States Letters Patent No. 188,305, of March 13, 1887. Such pipes do not come within the scope of the present invention, and are distinguished therefrom by the fact that in them the parts of the seam or joint are riveted or mechanically secured together, while the pipe that I now have in view is one in which there is a welded joint or seam—an article manifestly very much more desirable than and vastly superior to those just referred to.

Tubes composed of comparatively very thick blanks—such as gun-barrels—have heretofore been made by bringing the abutting edges of a spirally-wound blank into contact and welding such edges together, the article as a whole being heated and worked as one piece. Such process is not applicable to the practice of the present invention.

It has further been proposed to produce pipe by scarfing the edges of the blank and spirally winding the same and welding together its scarfed edges, and also by winding up a blank having symmetrical tongues and grooves upon the opposite side edges formed to interlock when spirally wound, and then closing the interlocking seam by welding, soldering, or otherwise. Both these schemes have, however, proved impracticable, because they have involved, among other difficulties, the heating of the blank throughout its whole extent to a temperature sufficient to effect the welding of its edges. This softens, makes porous, and weakens the metal, and its surface becomes scaly and rough and liable to oxidation. It also brings the blank into a condition that, under the strain and manipulation it is subject to during the coiling and welding operation, invariably permits it to become distorted and misshapen, so that regularly-formed and practicable pipe cannot be formed. The body of the blank is liable to collapse in the furnace, or if sufficiently heavy to not collapse it is then particularly liable to warp and lose its proper form under the action of the devices necessary to shape and hold it.

In order to successfully produce marketable pipe having a welded spiral seam, I have found it to be essential that the body of the strip or blank should in the finished pipe be to all intents and purposes intact, or in the same condition in which it was in the original strip or blank—a condition that disappears when it is once subjected to the heat referred to.

The improved process comprising the present invention consists of spirally winding the sheet-metal blank into cylindrical form with its opposite edges overlapping, heating the adjoining edges only of the blank as such edges are brought into contact by the act of winding, and then welding such edges together by suitably-applied pressure. The body of the pipe thus preserves the same quality, finish, stiffness, and regularity of surface which it possessed in the strip or blank. The metal composing the spiral seam is softened and weakened to some extent by the heat; but the seam, by reason of the double thickness of metal and its spiral direction, is fully as strong as the unweakened main portion of the pipe.

In practicing this invention strips or blanks of sheet metal, iron or steel, are wound spirally by machinery adapted to this purpose, so as to give the desired overlap to the opposite edges of the strip. As the overlying edge approaches the already-coiled underlying edge both edges are brought to a welding heat by any means adapted to accomplish this result without heating the body or main portion of the strip, and then the edges thus heated are pressed or forced into intimate contact by rolls or hammers or otherwise to form what is known as a "welded seam." One form of machine for thus producing this pipe is shown and described by me in my United States Letters Patent No. 280,403, issued July 3, 1883, on application filed September 10, 1881, and is the same as represented by drawings accompanying this specification. Reference is therefore made to said patent for a full description of such machine.

For the purpose of explaining the present method it will be necessary to refer only to the first four views, Figure 1 being a front elevation, Fig. 2 a plan, Fig. 3 a side elevation, and Fig. 4 a detail front elevation, of the welding-rolls.

Briefly stated, the blank is wound into its tubular form by inserting one of its ends between the upper side of the mandrel or former-block I and the lip of the circular guide K. The seaming or welding rolls D and G—one operating upon the outside and the other upon the inside of the tube—grasp the blank as it comes from the mandrel and draw it continuously forward, causing it to be wound up into the spiral cylindrical form with its opposite edges overlapping.

Various means have been shown for heating the blank; but these are not applicable in the present process, and accordingly attention is directed to those only that are applicable. These consist of the pipes L' and L", one leading from a supply of oil or other combustible fluid and the other carrying a jet of air. The streams of combustible fluid and air are brought together and ignited near the meeting edges of the blank, and the flame is directed upon such edges to bring them to the welding heat. Oxygen and hydrogen gases may be similarly employed, and the jet can be made to carry any required flux or soldering or brazing material. This heating flame or jet is usually applied directly to the inner surfaces of the edges of the blank—that is, between the curved underlying edge and the straight tangential overlying edge—so that both edges are heated simultaneously and equally. As the edges are thus brought to the desired welding temperature, the progress of the blank causes the heated portions as they leave the heating-jet to pass at once between the welding-rolls, so that the welding is promptly effected without the edges losing their heat and without the heated portions becoming misshapen or irregular in form. In this latter connection the rigid unheated body of the blank serves an important part, in that, by reason of its rigidity, the edges are held in proper position in spite of their tendency to warp and expand under the action of the heating-jet.

Pipe thus produced is superior to any similar article heretofore made as a practicable product for the market. Its joint portion is as strong as its body part, and therefore it is only necessary to provide a blank of the proper thickness and strength to suit the requirements of any given case, whereas with the common longitudinally-welded pipe, the seam being the weakest part, it is usually requisite to use blanks of excessive weight and thickness to insure proper strength of seam. This renders my pipe materially cheaper, since the amount of metal entering into its structure can be reduced. This method of heating and immediately welding the edges also permits making welded pipe from thinner blanks than has heretofore been possible, and this effects a great improvement in that class of pipes, since they can be produced more regular in size and in a much more finished appearance.

What I claim as new is—

The herein-described method of producing spirally-welded pipe or tubing, which consists in spirally winding the cool blank with its opposite edges overlapping, heating the overlapping edges at or near their point of junction only, the main portion or body of the blank remaining unaffected by the action of the heating-jet, and uniting such heated edges by the application of welding-pressure, substantially as and for the purposes hereinbefore set forth.

JOHN B. ROOT.

Witnesses:
ROBT. H. DUNCAN,
ROBT. F. GAYLORD.